(12) United States Patent
Smith

(10) Patent No.: US 6,570,589 B1
(45) Date of Patent: May 27, 2003

(54) METHOD AND APPARATUS FOR ASSOCIATING CAPABILITIES WITH A VIRTUAL INPUT DEVICE AND A DISPLAY OBJECT

(75) Inventor: Randall Smith, Palo Alto, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 1112 days.

(21) Appl. No.: 08/678,409

(22) Filed: Jul. 2, 1996

(51) Int. Cl.[7] .................................................. G06F 3/14
(52) U.S. Cl. ...................................... 345/751; 345/733
(58) Field of Search ................................. 395/329, 331, 395/332, 333, 334, 335, 339, 346, 349, 966, 967, 970; 345/329, 331, 333, 335, 339, 346, 966, 733, 751, 762, 765, 744, 967, 970

(56) References Cited

U.S. PATENT DOCUMENTS

| | | | | |
|---|---|---|---|---|
| 4,899,136 A | * | 2/1990 | Beard et al. ................ | 395/346 |
| 5,008,853 A | * | 4/1991 | Bly et al. .................... | 345/331 |
| 5,040,131 A | | 8/1991 | Torres | |
| 5,140,677 A | * | 8/1992 | Fleming et al. ............ | 395/349 |
| 5,163,130 A | * | 11/1992 | Hollot ........................ | 395/335 |
| 5,214,756 A | | 5/1993 | Franklin et al. | |
| 5,261,044 A | | 11/1993 | Dev et al. | |
| 5,335,346 A | | 8/1994 | Fabbio | |
| 5,337,407 A | * | 8/1994 | Bates et al. ................ | 345/331 |
| 5,394,522 A | | 2/1995 | Sanchez-Frank et al. | |
| 5,414,806 A | | 5/1995 | Richards | |
| 5,461,710 A | * | 10/1995 | Bloomfield et al. ........ | 395/333 |
| 5,491,783 A | * | 2/1996 | Douglas et al. ............ | 395/335 |
| 5,555,370 A | * | 9/1996 | Li et al. ..................... | 395/335 |

FOREIGN PATENT DOCUMENTS

WO    WO 91 02304    2/1991    ........... G06F/3/023

OTHER PUBLICATIONS

Access Control for Collaborative Environments, Proceedings of the Conference on Computer Supported Coopertive Work, vol.—1992, pp. 51–58.

Miro: Visual Specification of Security, IEEE TRasactions on Software Engineering, vol. 16, No. 10, Oct. 1, 1990, pp. 1185–1197.

* cited by examiner

*Primary Examiner*—Cao H. Nguyen
(74) *Attorney, Agent, or Firm*—Blakely Sokoloff Taylor & Zafman

(57) ABSTRACT

The present invention provides a method and apparatus for associating capabilities between a virtual input device and a display object. According to one embodiment of the present invention, capabilities are associated with a virtual input device by selecting a new capability, the new capability represented on a display device as a new capability display object, and associating the new capability with the virtual input device. According to another aspect of the invention, the virtual input device represents a user. Additionally, a display object can generate a private capability object for association with a virtual input device.

21 Claims, 7 Drawing Sheets

METHOD AND APPARATUS FOR ASSOCIATING CAPABILITIES WITH A VIRTUAL INPUT DEVICE AND A DISPLAY OBJECT

FIELD OF THE INVENTION

This invention relates to the field of multi-user interactive systems. Specifically, this invention relates to a method and apparatus for associating capabilities between a virtual input device and a display object.

BACKGROUND OF THE INVENTION

FIG. 1 illustrates a multi-user interactive computer system 100, including multiple "display objects" or items that can be manipulated by numerous users simultaneously. The display objects in multi-user interactive environment 100 include virtual input devices 125 and 127, menu 135, button 130 and objects OBJ 1–OBJ 5 (any other type of visual display objects).

In this multi-user environment, it may be desirable to limit users' access rights to interact with the display objects. Examples of limiting access rights exist in a number of computer systems today. The MACINTOSH™ operating system, from Apple Computer, Incorporated of Cupertino, Calif., for example, allows the owner of a folder or file to assign specific rights to other users on a network, thus specifying user access to those files or folders. The owner marks the folder with an indicator such as "Read," indicating to the computer system that users who access the system have READ privileges to that folder. Each user that accesses the system will thus be able to read all files in this folder. Each user's access is independent of other users because each user will "see" a view of the system that is independent of other users.

In a multi-user environment, however, multiple users may be interacting with a single object. Each user is represented on the computer display screen by a separate virtual input device, and the users can "see" each other, as well as other display objects on the computer display screen. As the number of users and objects increase, the type of access right manipulation described above becomes too cumbersome for a system "facilitator" to function effectively. Additionally, it becomes increasingly difficult for the system facilitator to determine total access rights for each user in the multi-user environment. The system facilitator will have to examine each object in the environment to determine whether a particular user has access to the object. In this multi-user environment, therefore, it is desirable for access rights to be easily manipulable, to allow a system facilitator to easily create, assign and revoke access rights, and to easily view all access rights associated with each user in the environment.

SUMMARY OF THE INVENTION

The present invention provides a method and apparatus for associating capabilities between a virtual input device and a display object. According to one embodiment of the present invention, capabilities are associated with a virtual input device by selecting a new capability, the new capability represented on a display device as a new capability display object, and associating the new capability with the virtual input device.

According to another aspect of the invention, the virtual input device represents a user. Additionally, a display object can generate a private capability object for association with a virtual input device.

Other objects, features and advantages of the present invention will be apparent from the accompanying drawings and from the detailed description.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention provides a solution to the disadvantages of prior art methods for manipulating object capabilities. Specifically, the present invention provides a method and apparatus for associating capabilities between a virtual input device and a display object. A "display object" in the context of this specification includes any item within the computer system that can be represented on a display device as a visual object. A display object in this specification also includes a single display object, or multiple display objects in a user- or system-defined collection or "region" on the display device. In the following detailed description, numerous specific details are set forth in order to provide a thorough understanding of the present invention. It will be apparent to one of ordinary skill in the art, however, that these specific details need not be used to practice the present invention. In other instances, well know structures, interfaces and processes have not been shown in detail in order not to unnecessarily obscure the present invention.

Figure 1:
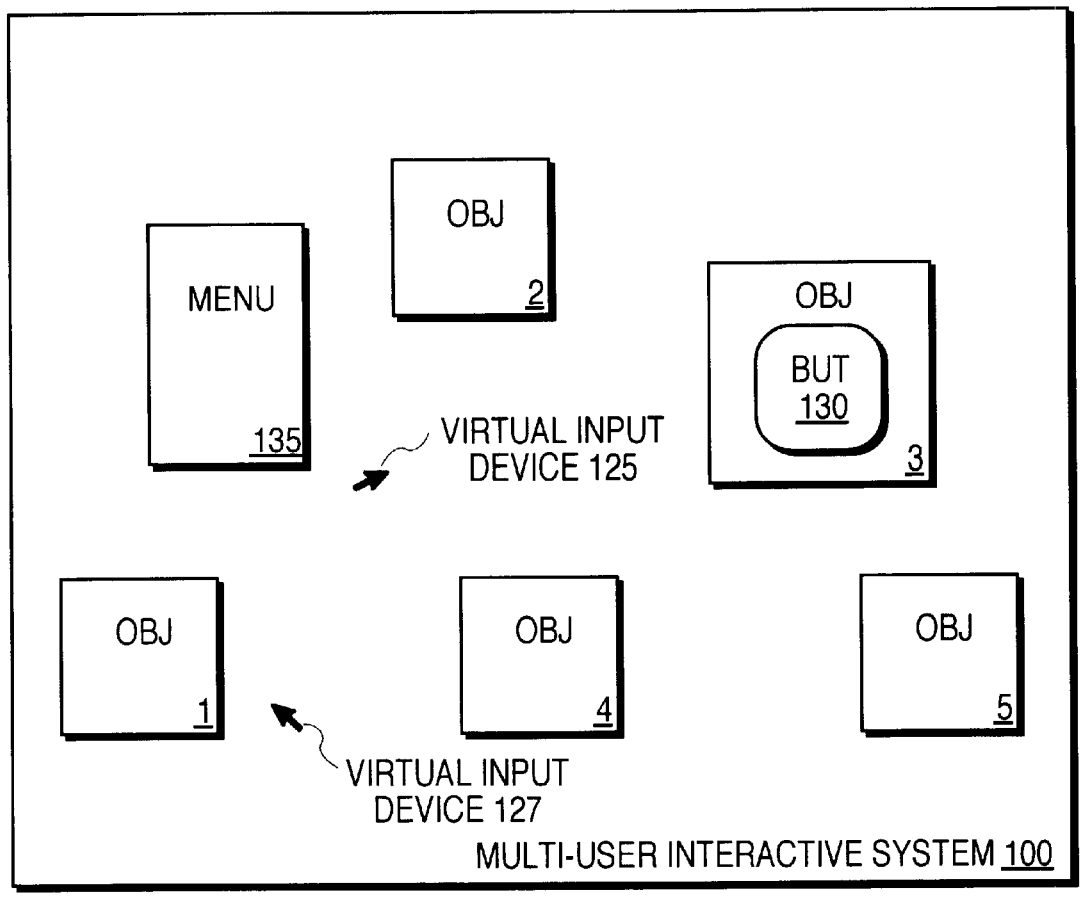
FIG. 1 illustrates a multi-user interactive computer system
Figure 2A:
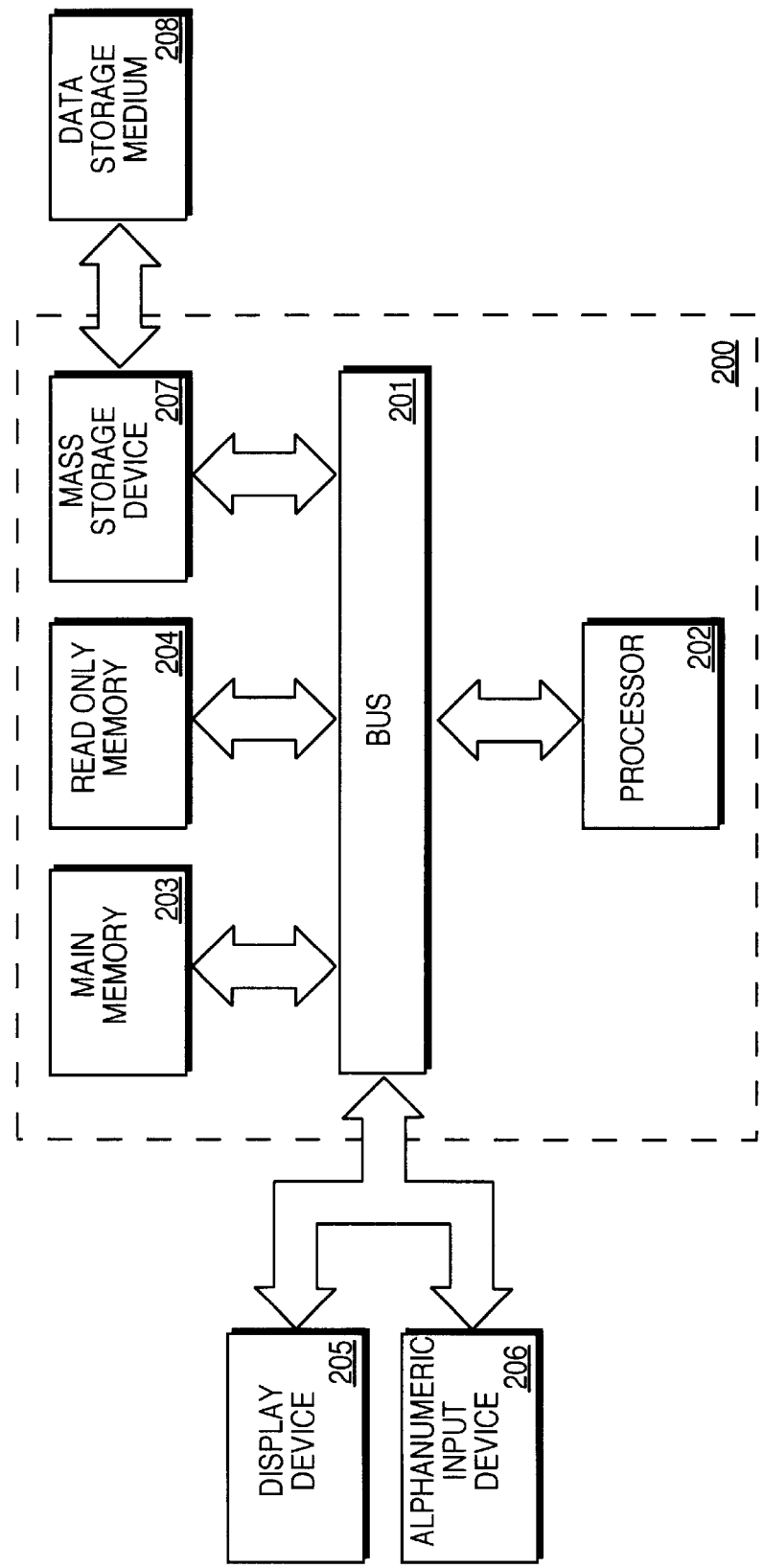
FIG. 2A illustrates a typical computer system in which the present invention operates

FIG. 2 illustrates a typical computer system 200 in which the present invention operates. The preferred embodiment of the present invention is implemented on a Sun™ Workstation manufactured by Sun Microsystems™ of Mountain View, Calif. Alternate embodiments may be implemented on an IBM™ Personal Computer manufactured by IBM Corporation of Armonk, N.Y. or a Macintosh™ computer manufactured by Apple™ Computer, Incorporated of Cupertino, Calif. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium™ microprocessor manufactured by Intel™ Corporation. A Motorola™ 68040 or Power PC™ brand microprocessor manufactured by Motorola Corporation may also be used. It will be apparent to those of ordinary skill in the art, however, that other varieties of processors may be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using data storage device 207 and downloads this information into random access memory 203 for execution. Processor 202, then executes an instruction stream from random access memory 203 or read-only memory 204. Command selections and information input at alphanumeric input device 206 are used to direct the flow of instructions executed by processor 202. Equivalent input device 206 may also be a pointing device such as a conventional mouse or trackball device. The results of this processing execution are then displayed on display device 205.

The preferred embodiment of the present invention is implemented as a software module, which may be executed on a computer system such as computer system 200 in a conventional manner. Using well known techniques, the application software of the preferred embodiment is stored on data storage medium 208 and subsequently loaded into and executed within computer system 200. Once initiated, the software of the preferred embodiment operates in the manner described below.

Figure 2B:
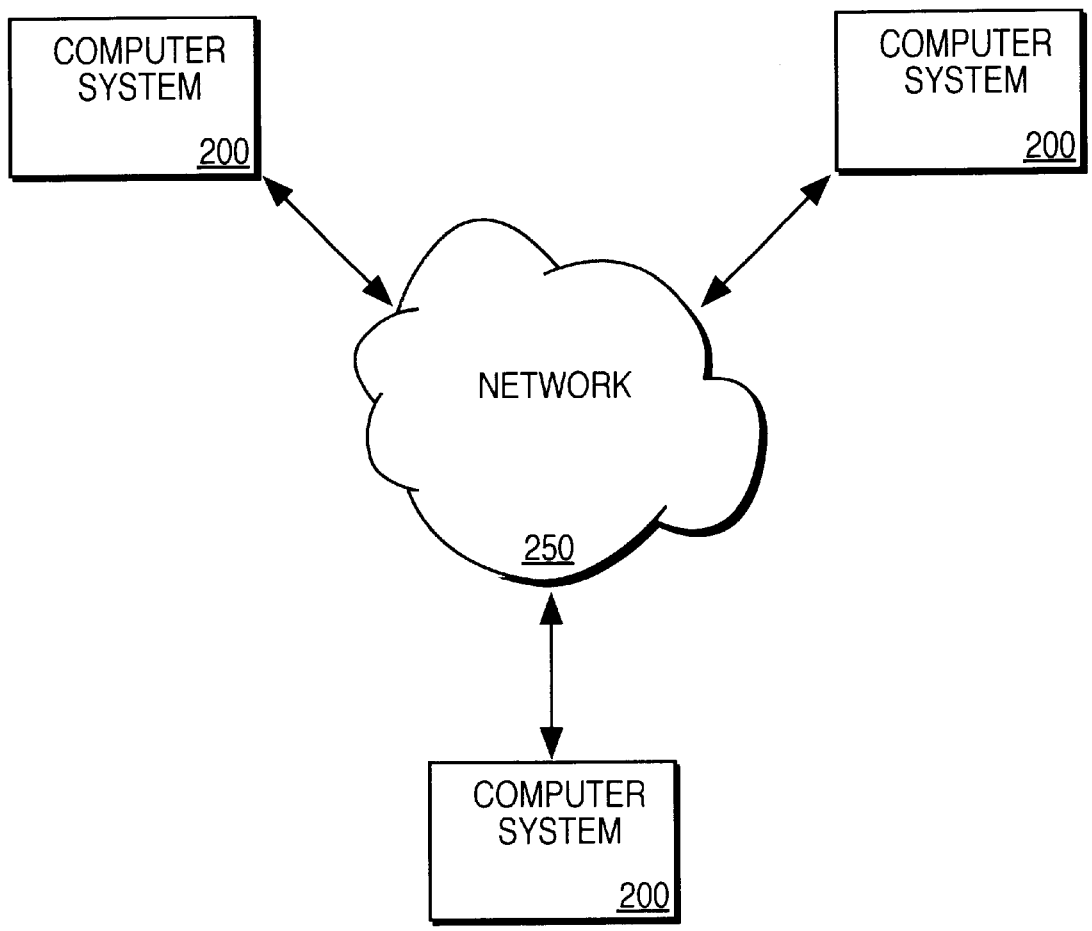
FIG. 2B illustrates a typical network environment within which the present invention operates

FIG. 2B illustrates a typical network within which the present invention can be implemented. Computer systems 200 are interconnected via network 250. It will be apparent to one of ordinary skill in the art that network 250 can comprise any type of network, including the Internet, a Local Area Network (LAN), a Wide Area Network (WAN), an Ethernet network, an ISDN network, a cable network or a conventional phone line.

Figure 3:
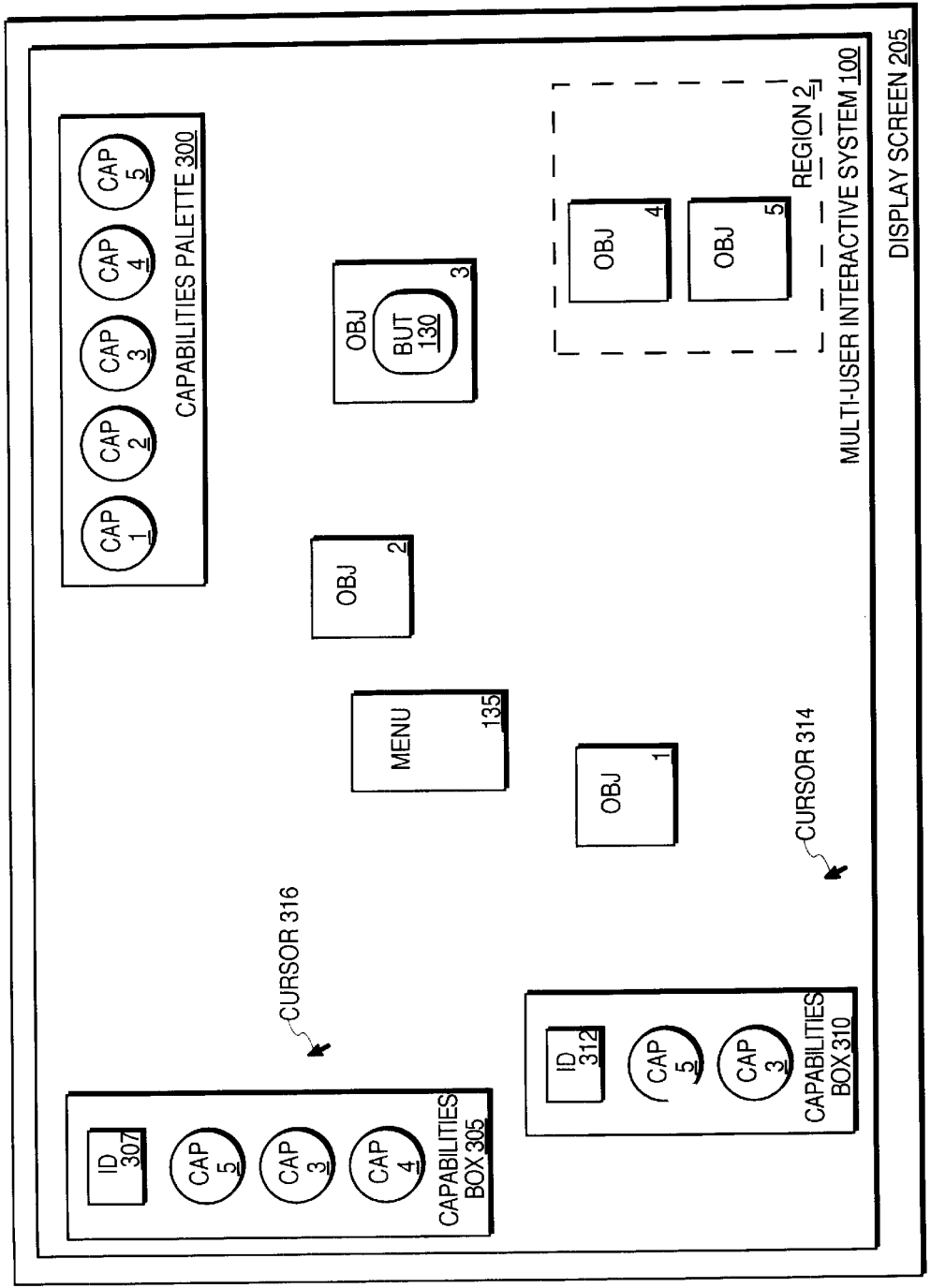
FIG. 3 illustrates one embodiment of the present invention

FIG. 3 illustrates one embodiment of the present invention. Multi-user interactive system 100 includes a variety of display objects such as virtual input devices 125 and 127, menu 135, button 130, and objects OBJ 1–OBJ 5. Examples of virtual input devices include mouse cursors, text editing cursors and other devices that translate the input of a device such as a mouse or a trackball system, into visible motion or output on the computer display device 205. These virtual input devices are displayed as cursor symbols 314 and 316 in FIG. 3. It will be apparent to one of ordinary skill in the art that other virtual input devices and screen markers may also be utilized.

Capabilities palette 300 represents a collection of capabilities. This grouping is performed merely to simplify access to the most commonly accessed capabilities. The grouping is not required, however, and the display objects representing the capabilities may be displayed anywhere within multi-user interactive environment 100.

As illustrated, capabilities palette 300 includes multiple types of capabilities that can be assigned to virtual input devices within multi-user interactive system 100. Each of these capabilities represents the right to interact in some way with display objects or a "regions" within multi-user interactive system 100. A region, such as REGION 2 illustrated in FIG. 3, represents a user or system defined set of display objects that can be simultaneously processed.

Capabilities CAP 1–CAP 5 include capabilities such as "Mouse right" (enable right mouse button), "Mouse middle" (enable middle mouse button), "Grab object" (enable cursor device to pick up display object), "Edit text" (enable user to edit text) and "Press button" (enable button). Other appropriate capabilities can be defined for a given multi-user environment. Capabilities can also be grouped into "bundles" and assigned collectively.

In one embodiment of the present invention, each of these capabilities is a manipulable display object itself. The rights to access the capabilities are themselves defined as capabilities. As such, each display object may either be a capability, or have a capability assigned to it. This ability to recursively assign capabilities to capabilities provides the system facilitator with a powerful tool to control access rights at multiple levels.

For example, "Grab object" is a capability in capabilities palette 300. The "Grab object" capability is displayed as a display object, and this display object can have one or more capabilities associated with it. This "second level" of capabilities is also represented as display objects on display device 205, and each of these display objects can have further capabilities recursively associated with it. The system facilitator can thus define comprehensive and flexible levels of access control for each virtual input device and each display object by simply creating or removing capabilities display objects. This simplicity is a significant advantage in a fast-paced environment where multiple users are constantly accessing multiple objects.

Capabilities boxes 305 and 310 display capabilities associated with users within the multi-user interactive environment 100. Capabilities box 305 displays the capabilities associated with a user having ID 307 (hereafter referred to as "user 307") and capabilities box 310 displays the capabilities associated with a user having ID 312 (hereafter referred to as "user 312"). Generally, a virtual input device is associated with each user. A virtual input device may, however, be temporarily unassociated with any user, as described further below.

In one embodiment of the present invention, by dragging a capability from capabilities palette 300 into capabilities box 305 or 310, that capability can be acquired by the respective virtual input device associated with users 307 and 312. Generally, the capability is dragged from capabilities palette 300 by a system facilitator. A user may, however, also have the capabilities necessary to drag a capability from capabilities palette 300.

If user 307 does not have a "Grab object" capability, for example, the user will not be able to manipulate display objects in multi-user interactive system 199. User 307 will thus not be able to use his associated virtual input device to drag a capability from capabilities palette 300 because the virtual input device will not be able to grab the display object. If the system facilitator drags the "Grab object"

capability from capabilities palette 300 into capabilities box 305, the virtual input device associated with user 307 "acquires" the capability to pick up display objects in the system. Representing capabilities as display objects thus presents a system facilitator with a powerful, easily manipulable ability to control access rights.

Additionally, as described above, capabilities can also be associated between display objects and virtual input devices that are independent of users. For example, in FIG. 3, virtual input device (cursor) 314 can be associated with capability "Grab object." Virtual input device 314 may not be associated with any user at the time the capability is associated with it. Virtual input device 314 is thus available to be "picked up" or selected by any user in the multi-user interactive system 100. If, for instance, user 312 picks up the virtual input device 314, user 312 will acquire the "Grab object" capability associated with virtual input device 314. If desired, user 312 can also "drop" the capability by dropping the virtual input device.

Figure 4:
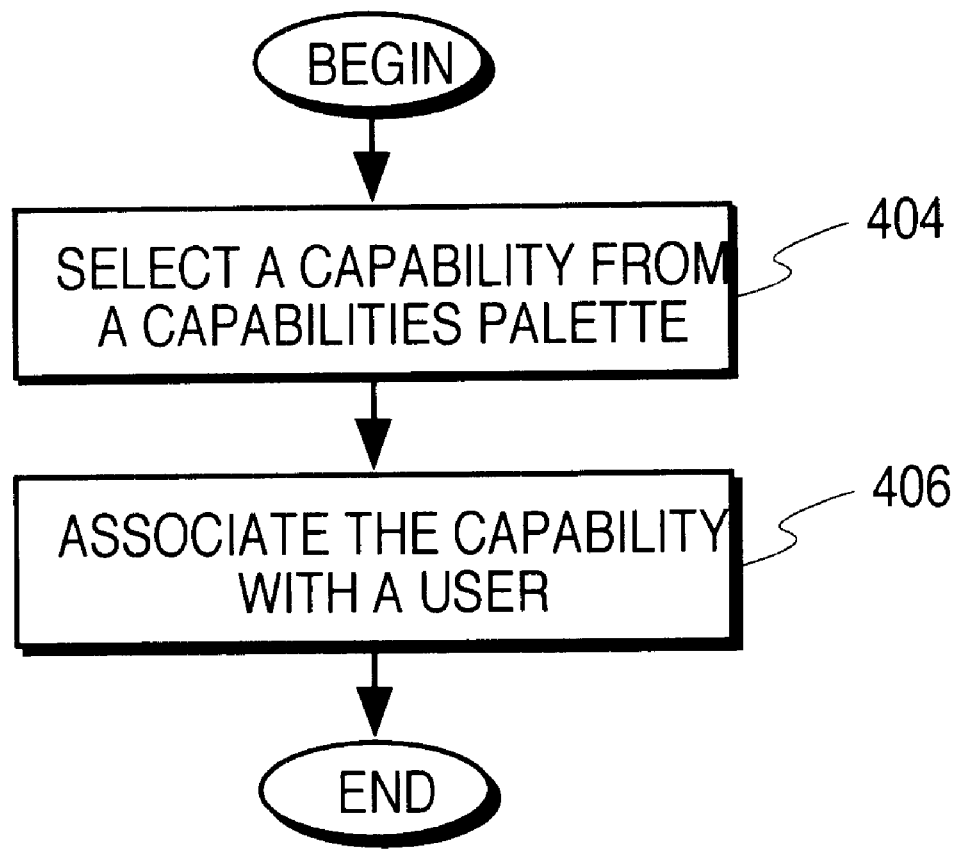
FIG. 4 is a flow chart illustrating the steps performed according to one embodiment of the present invention

FIG. 4 is a flow chart illustrating one embodiment of the present invention. In step 402 in FIG. 4, a capability is selected from a capabilities palette. This capability is then associated with a user in step 404. The association is accomplished by dragging a display object associated with the capability from the capability box into the display object representing the user.

Figure 5:
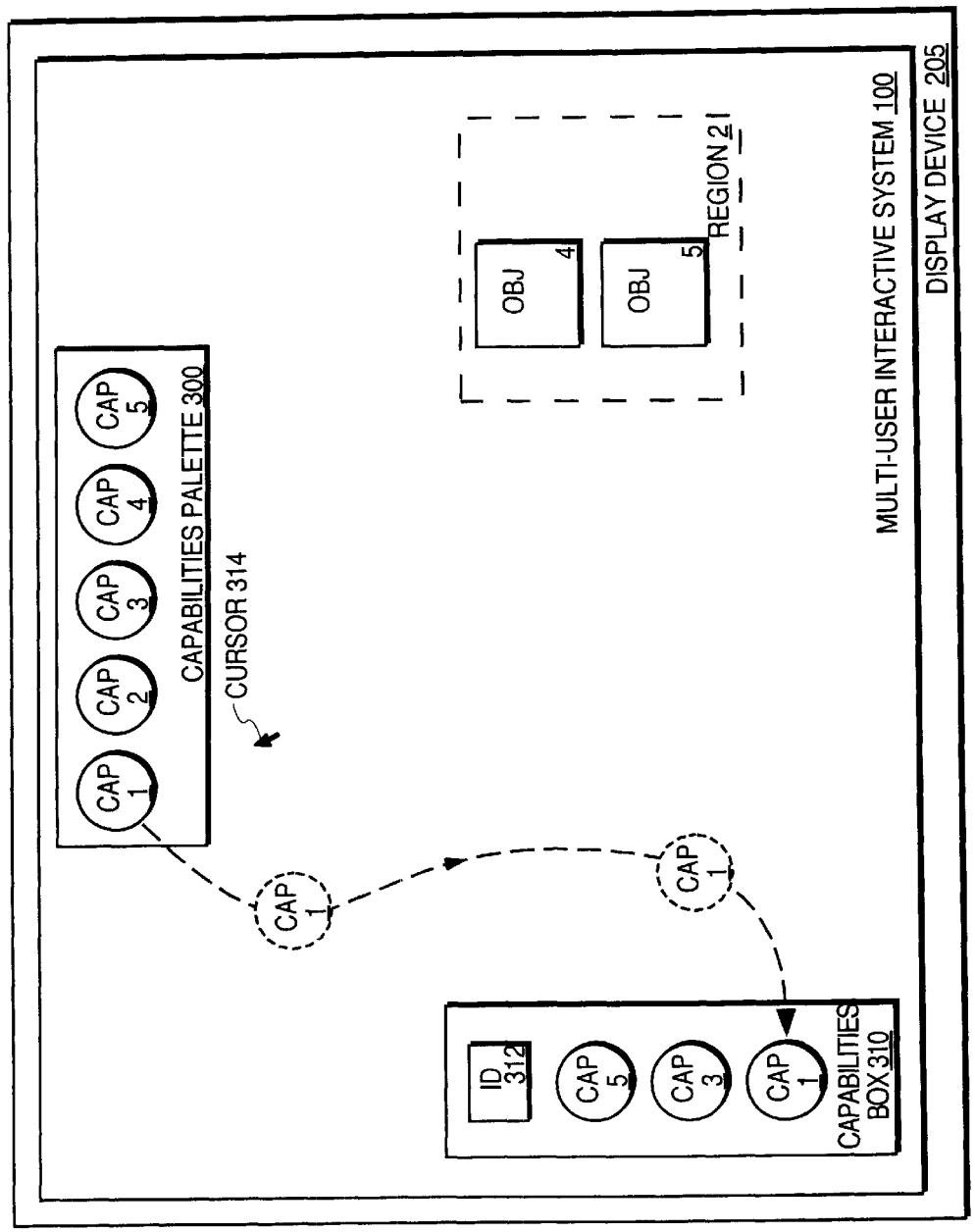
FIG. 5 illustrates a new capability being dragged from the capabilities palette and being added into a capabilities box

For example, as illustrated in FIG. 3, user 312 has capabilities CAP 5 and CAP 3 associated with him. FIG. 5 illustrates capabilities box 310 after a new capability is associated with user 312, according to the steps described in the flow chart of FIG. 4. Cursor object 314 is used to drag CAP 1 from capabilities palette 300 into capabilities box 310. CAP 1 is now associated with user 312 and all display objects in multi-user interactive system 100. Instead of all display objects in multi-user interactive system 100, CAP 1 can also be defined for a specific object on the display screen, such as OBJ 2, or a user or system defined region, such as REGION 2.

Figure 6:
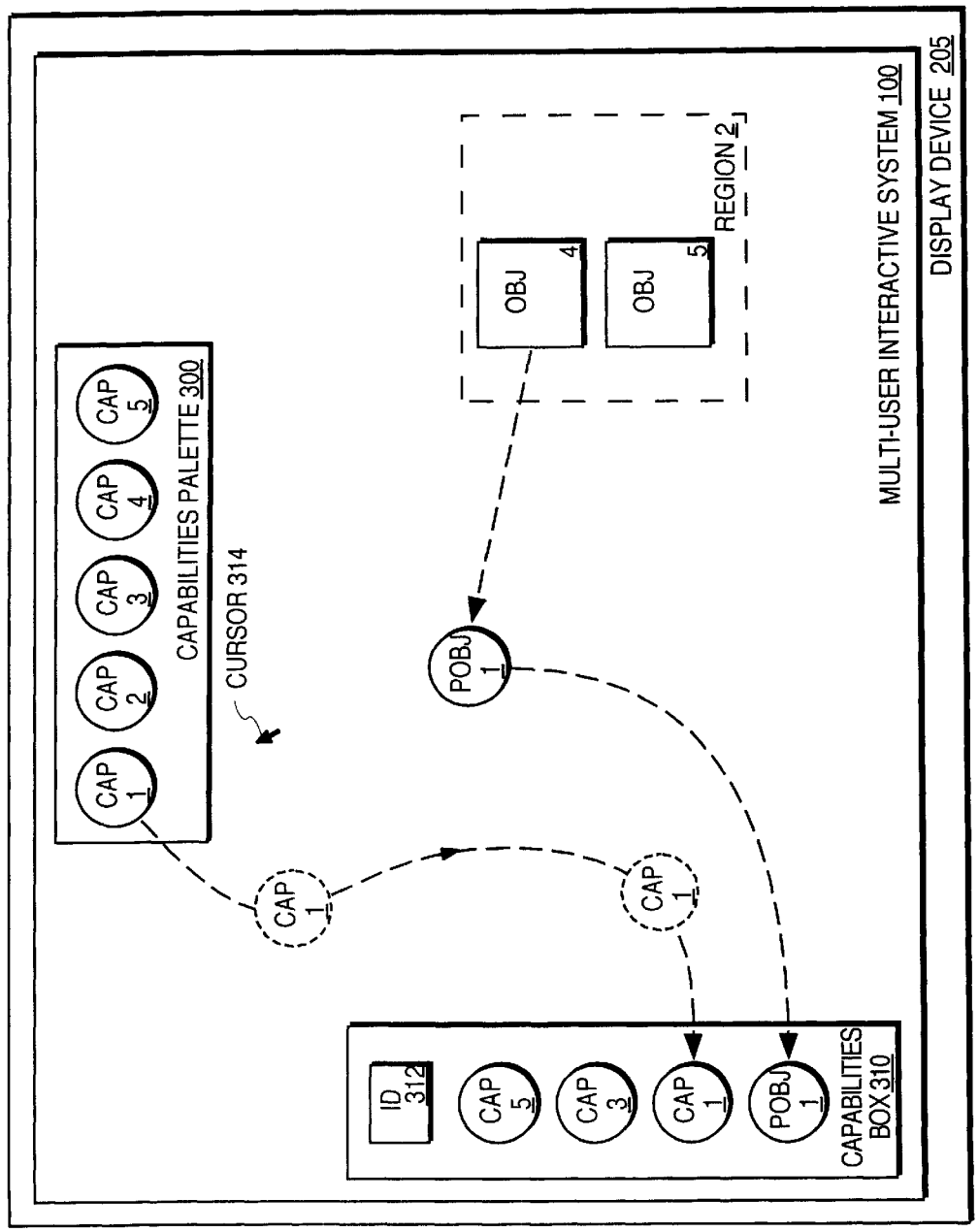
FIG. 6 illustrates a private display object being generated and dragged into a capability box

In another embodiment of the present invention, each display object or region can create a "private" capability object representing capabilities for itself. This private capability object acts as a second layer of access rights, over the capabilities described above. For example, capabilities box 310 in FIG. 6 has specific capabilities, CAP 3 and CAP 5, assigned to it. These capabilities allow user 312 to manipulate display objects in multi-user interactive system 100. Additionally, however, OBJ 4, for example, can generate a private capability object or set of capability objects, and represent this private capability object as a display object, POBJ 1. In this case, user 312 will not be able to manipulate OBJ 5 unless, in addition to the other capabilities, POBJ 1 is also selected, dragged into capabilities box 310 and associated with user 312. The private display object thus represents an additional layer of access rights that can be controlled on a per-object basis.

For instance, if capabilities box 310 includes capabilities CAP 3, CAP 5 and "Press button," a system facilitator can remove the "Press button" capability from capabilities box 310, thus revoking the ability from user 312 to press any button display objects in multi-user interactive system 100. The system facilitator may, however, chose to allow user 312 to press only one button, OBJ 4, which may be a help button, for example. The facilitator can thus select OBJ 4 and request a private "Press button" capability, POBJ 1. If the facilitator then assigns POBJ 1 to user 312, user 312 will acquire the ability to press help button OBJ 4, although the "Press button" capability for the rest of the display objects in the system has been revoked. This provides the system facilitator with a significant degree of control over object access rights in a multi-user system.

Thus, a method and apparatus for associating capabilities between a virtual input device and a display object is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

I claim:

1. A computer-implemented method for associating access rights with a virtual input device, said computer-implemented method comprising the steps of:

selecting a new access right represented by a first object, said new access right representing a predefined right to interact with another object; and acquiring said new access right by said virtual input device by causing the first object to interact with a second object representing access rights of said virtual input device.

2. The computer-implemented method of claim 1 wherein said virtual input device represents a user.

3. The computer-implemented method of claim 2 wherein a user capabilities box is displayed on said display device, said user capabilities box displaying current access rights associated with said user, said step of associating said new access rights with said virtual input device, further including the step of dragging said first object into said user capabilities box.

4. The computer-implemented method of claim 1 wherein said step of selecting said new access right includes the step of selecting said new access right from a list of access rights.

5. The computer-implemented method of claim 4 wherein said step of selecting said new access right from said list of access right, includes the step of selecting said new access right from a graphical representation of said list of access rights.

6. The computer-implemented method of claim 1 further including the steps of:

generating a private object, said private object representing access rights to a display object; and associating said private object with said virtual input device.

7. The computer-implemented method of claim 6 wherein said step of associating said private object with said virtual input device further includes the step of dragging said private object into said user capabilities box.

8. A machine readable medium having stored thereon data representing sequences of instructions, which when executed by a computer system, cause said computer system to perform the steps of:

selecting a new access right represented by a first object, said new access right representing a predefined right to interact with another object; and acquiring said new access right by said virtual input device by causing the first object to interact with a second object that represents current access rights of said virtual input device.

9. The machine readable medium of claim 8 wherein said virtual input device represents a user.

10. The machine readable medium of claim 9 wherein a user capabilities box is displayed on said display device, said user capabilities box displaying current access rights associated with said user, said step of associating said new access right with said virtual input device further including the step of dragging said first object into said user capabilities box.

11. The machine readable medium of claim 8 wherein said step of selecting said new access right includes the step of selecting said new access right from a list of access rights.

12. The machine readable medium of claim 11 wherein said step of selecting said new access right from said list of access rights includes the step of selecting said new access right from a graphical representation of said list of access right.

13. The machine readable medium of claim 8 further including sequences of instructions for performing the steps of:

generating a private object, said private object representing access rights to a display object; and associating said private object with said virtual input device.

14. The machine readable medium of claim 13 wherein said step of associating said private object with said virtual input device further includes the step of dragging said private object into said user capabilities box.

15. A computer system for associating access rights with a virtual input device, said computer system comprising:

a display device;

a virtual input device;

a mechanism configured to cause a new access right to be acquired by said virtual input device by causing a first object representing a new access right to interact with a second object that represents current access rights of said virtual input device, said first and second objects being displayable on said display device.

16. The computer system of claim 15 wherein said virtual input device represents a user.

17. The computer system of claim 16 wherein a user capabilities box is displayed on said display device, said user capabilities box displaying current capabilities associated with said user, said mechanism configured to associate said new capability with said virtual input device further including a mechanism configured to drag said new capability display object into said user capabilities box.

18. The computer-implemented method of claim 15 wherein said mechanism configured to select said new capability includes a mechanism configured to select said new capability from a list of capabilities.

19. The computer system of claim 18 wherein said mechanism configured to select said new capability from said list of capabilities includes a mechanism configured to select said new capability from a graphical representation of said list of capabilities.

20. The computer system of claim 15 further including:

a mechanism configured to generate a private capability object, said private capability object representing access rights to a display object; and a mechanism configured to associate said private capability object with said virtual input device.

21. The computer system of claim 20 wherein said mechanism configured to associate said private capability object with said virtual input device further includes a mechanism configured to drag said private capability object into said user capabilities box.

* * * * *